United States Patent
Nedovic et al.

(10) Patent No.: US 11,687,679 B2
(45) Date of Patent: Jun. 27, 2023

(54) CURRENT FLATTENING CIRCUIT FOR PROTECTION AGAINST POWER SIDE CHANNEL ATTACKS

(71) Applicant: NVIDIA Corp., Santa Clara, CA (US)

(72) Inventors: Nikola Nedovic, San Jose, CA (US); Sudhir Shrikantha Kudva, Dublin, CA (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

(21) Appl. No.: 18/046,275

(22) Filed: Oct. 13, 2022

(65) Prior Publication Data

US 2023/0053487 A1    Feb. 23, 2023

Related U.S. Application Data

(62) Division of application No. 16/856,952, filed on Apr. 23, 2020, now Pat. No. 11,507,704.

(51) Int. Cl.
| | | |
|---|---|---|
| *G06F 21/75* | (2013.01) | |
| *H02M 1/44* | (2007.01) | |
| *H02M 1/08* | (2006.01) | |
| *H02M 3/155* | (2006.01) | |

(52) U.S. Cl.
CPC ............ *G06F 21/755* (2017.08); *H02M 1/08* (2013.01); *H02M 1/44* (2013.01); *H02M 3/155* (2013.01)

(58) Field of Classification Search
CPC .................................................... G06F 21/755
USPC ............................................................ 726/34
See application file for complete search history.

(56) References Cited

U.S. PATENT DOCUMENTS

| | | | |
|---|---|---|---|
| 5,045,804 A | | 9/1991 | Sugawara et al. |
| 5,600,187 A | * | 2/1997 | El-Hamamsy ..... H05B 41/2806 361/278 |
| 6,269,763 B1 | | 8/2001 | Woodland |
| 6,275,395 B1 | | 8/2001 | Inn et al. |
| 6,281,731 B1 | | 8/2001 | Fifield et al. |
| 6,414,519 B1 | | 7/2002 | Abernathy |
| 6,498,751 B2 | | 12/2002 | Ordonez et al. |
| 8,816,748 B2 | | 8/2014 | Kumar et al. |
| 9,024,678 B2 | | 5/2015 | Cavalotto et al. |
| 9,135,453 B2 | | 9/2015 | Shen-Orr et al. |
| 9,158,316 B2 | | 10/2015 | Theiler |
| 9,509,707 B2 | | 11/2016 | Patne et al. |
| 9,721,093 B2 | | 8/2017 | Poornachandran et al. |
| 9,755,822 B2 | | 9/2017 | Han et al. |
| 9,774,614 B2 | | 9/2017 | Patne et al. |
| 9,787,171 B2 | | 10/2017 | Fort |
| 9,812,954 B1 | | 11/2017 | Kose et al. |
| 9,891,639 B2 | * | 2/2018 | Fort ..................... G06F 21/755 |
| 9,970,986 B2 | | 5/2018 | Hampel et al. |
| 10,042,380 B1 | * | 8/2018 | Hung ....................... G05F 5/00 |

(Continued)

OTHER PUBLICATIONS

Carlos Tokunaga et al. "Secure AES Engine with Local switched-capacitor current equalizer", IEEE Solid State Circuits Conference (ISSCC), 2009, pp. 64-65.

(Continued)

*Primary Examiner* — Tomi Skibinski
(74) *Attorney, Agent, or Firm* — Rowan TELS LLC; Charles Mirho; Robert Auerbach

(57) ABSTRACT

Various implementations of a current flattening circuit are disclosed, including those utilizing a feedback current regulator, a feedforward current regulator, and a constant current source.

13 Claims, 14 Drawing Sheets

(56) References Cited

U.S. PATENT DOCUMENTS

| | | |
|---|---|---|
| 10,389,519 B2 | 8/2019 | Cheng et al. |
| 10,423,207 B2 | 9/2019 | Reed et al. |
| 10,958,414 B2 | 3/2021 | Stark |
| 11,227,190 B1 | 1/2022 | Li et al. |
| 11,283,349 B2 | 3/2022 | Kudva et al. |
| 11,348,000 B1 | 5/2022 | Ding et al. |
| 2005/0275464 A1 | 12/2005 | Filoramo et al. |
| 2007/0094623 A1 | 4/2007 | Chen et al. |
| 2016/0190988 A1 | 6/2016 | Lin et al. |
| 2018/0006638 A1 | 1/2018 | Chen et al. |
| 2019/0007223 A1 | 1/2019 | Vaidya et al. |
| 2019/0121928 A1 | 4/2019 | Wu et al. |
| 2020/0151288 A1 | 5/2020 | Ma et al. |
| 2020/0210805 A1 | 7/2020 | Drozdowski et al. |
| 2020/0302250 A1 | 9/2020 | Chu et al. |
| 2020/0327417 A1 | 10/2020 | Xie et al. |
| 2021/0334411 A1 | 10/2021 | Nedovic et al. |
| 2022/0004875 A1 | 1/2022 | Koike-Akino et al. |
| 2022/0027546 A1 | 1/2022 | Ren et al. |
| 2022/0058466 A1 | 2/2022 | Yang et al. |
| 2022/0245425 A1 | 8/2022 | Sheikh et al. |

OTHER PUBLICATIONS

Debayan Das et al., EM and Power SCA-Resilient AES-256 in 65nm CMOS Through >350× Current-Domain Signature Attenuation, IEEE ISSCC 2020, Feb. 19, 2020.

Girish B. Ratanpal et al. "An On-Chip Signal Suppression Countermeasure to Power Analysis Attacks", IEEE Transactions on dependable and secure computing, Jul.-Sep. 2004, pp. 179-189.

Oleg Garitselov1 Fast-Accurate Non-Polynomial Metamodeling for nano-CMOS PLL Design Optimization; IEEE:2012; pp. 317-321.

Radu Muresan et al. "Protection Circuit against Differential Power Analysis Attacks for Smart Cards", IEEE Transactions on Computers, vol. 57, No. 11, p. 1540-1549, Nov. 2008.

* cited by examiner

CURRENT FLATTENING CIRCUIT FOR PROTECTION AGAINST POWER SIDE CHANNEL ATTACKS

BACKGROUND

In computer security, a side-channel attack is any attack based on information gained from the implementation of a computer system, rather than weaknesses in the implemented algorithm itself (e.g., cryptanalysis and software bugs). Timing information, power consumption, and electromagnetic leaks can provide information on the operation of the system that may be exploited.

Some side-channel attacks utilize technical knowledge of the internal operation of the system, while others, such as differential power analysis, are effective as black-box attacks. Differential power analysis (DPA) is a side-channel attack that involves analyzing power consumption measurements from a system, often using statistical methods. The attack exploits leakage of internal power consumption information back to supply pins external to the circuit package. Varying power consumption can occur when microprocessors or other secure hardware perform secure operations such as cryptographic algorithms using secret keys. Using DPA, an adversary can obtain information at the package pins about power consumption from multiple operations performed by a secure load in an electronic device.

One approach to protecting against side-channel attacks utilizes circuits that prevent the power fluctuations that arise from computations in protected circuits from propagating back to pins of the circuit package, where such fluctuations may be exploited. Circuits providing such prevention are known as "current flattening circuits".

BRIEF SUMMARY

This disclosure relates to a current flattening circuit for an electrical load. The current flattening circuit includes one or more pass-gate transistors arranged in series with the load. A differential high pass filter is coupled across the one or more pass-gate transistors. A controlled current source generates a proportional shunt current for the load in response to the differential high pass filter output.

This disclosure further relates to a current flattening circuit comprising at least one PMOS transistor, a shunt transistor, and a differential amplifier. The PMOS transistor is interposed between a power supply and a load. The shunt transistor and differential amplifier are each coupled to a node between the at least one PMOS transistor and the load. The shunt transistor gate voltage is configured to be controlled by the differential amplifier.

In addition, this disclosure relates to a current flattening circuit that includes a shunt transistor, a load current sensor, and a differential amplifier. The shunt transistor is coupled to receive current directly from a power supply. The load current sensor is coupled to directly receive current from the power supply and to supply current directly to a load. The differential amplifier is coupled across the load current sensor to control the gate of the shunt transistor.

This disclosure also relates to a current flattening circuit that comprises a load current sensor, a differential high pass filter, and a differential amplifier. The load current sensor is interposed between a power supply and a load. The differential high pass filter has a gain and is coupled across the load current sensor. The differential amplifier is coupled to the outputs of the differential high pass filter and to the drive gate of a shunt transistor of the load.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A current regulator may be utilized to detect the transient behavior of a load current, process the detected load current, and generate a regulated current that is complimentary to the load current. "Current regulator" refers to a circuit that generates a control input signal to a controlled current source. The composite of the load and regulated currents ideally equals the supply current. The alternating current value of the supply current may be zero across frequencies in an ideal circuit designed to protect against side-channel attacks.

Figure 1:
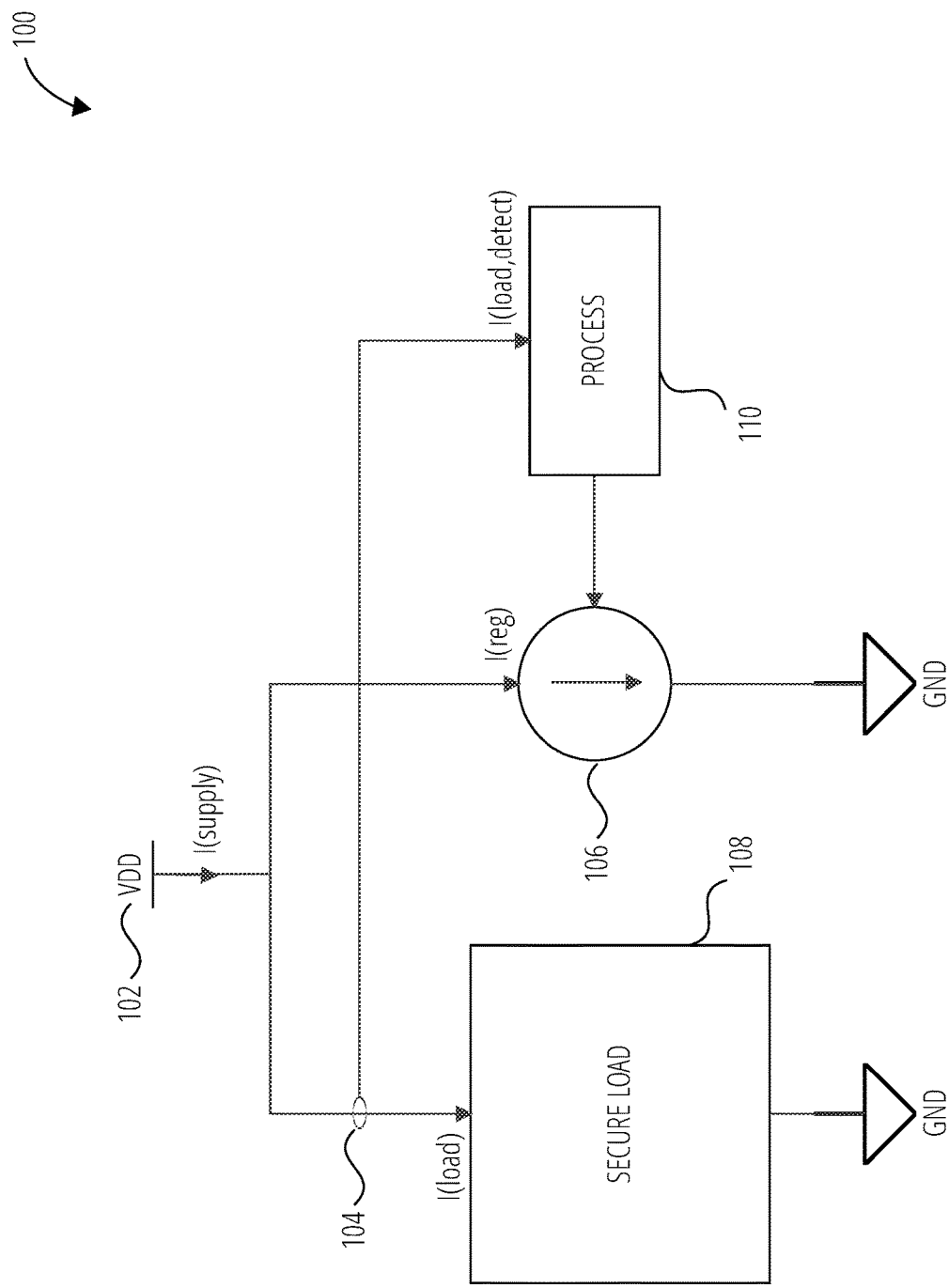
FIG. 1 depicts a side-channel attack protection circuit 100 in accordance with one embodiment.

FIG. 1 depicts a conceptual model of a side-channel attack protection circuit 100. The side-channel attack protection circuit 100 comprises a power supply voltage 102 generating a supply current $I_{supply}$, a current tap 104 on the supply current, a shunt current 106 to draw some of the supply current ($I_{reg}$) to ground thus creating a load current $I_{load}$ to the circuit load 108 with fewer AC components, and a processing circuit 110 to transform the detected supply current to a control for the shunt current 106.

Figure 2:
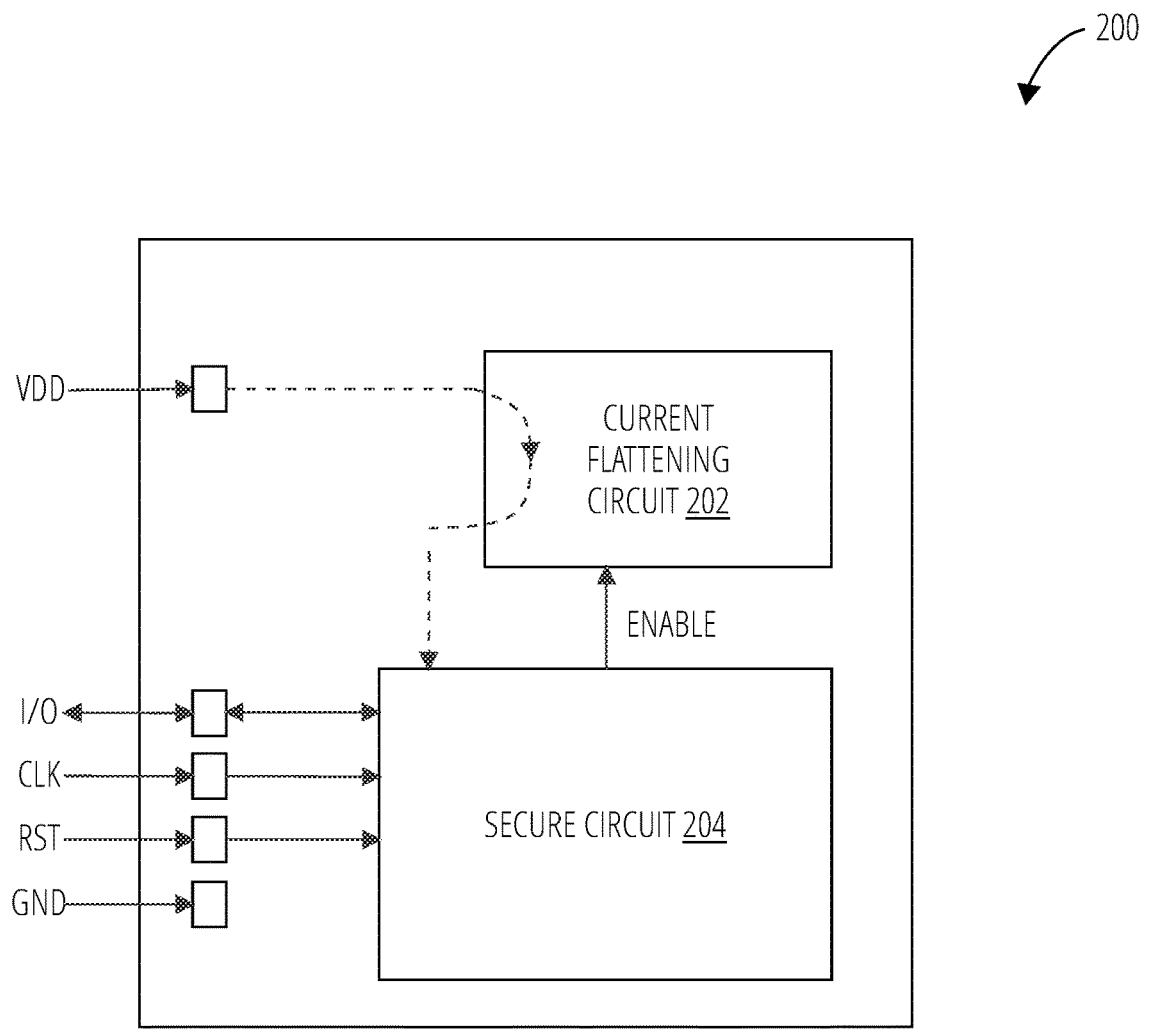
FIG. 2 depicts a prior art circuit package 200 in accordance with one embodiment.

FIG. 2 depicts a prior art circuit package 200. The circuit package 200 comprises side-channel attack protection for a secure circuit 204, the side-channel attack protection being in the form of a current flattening circuit 202.

Figure 3:
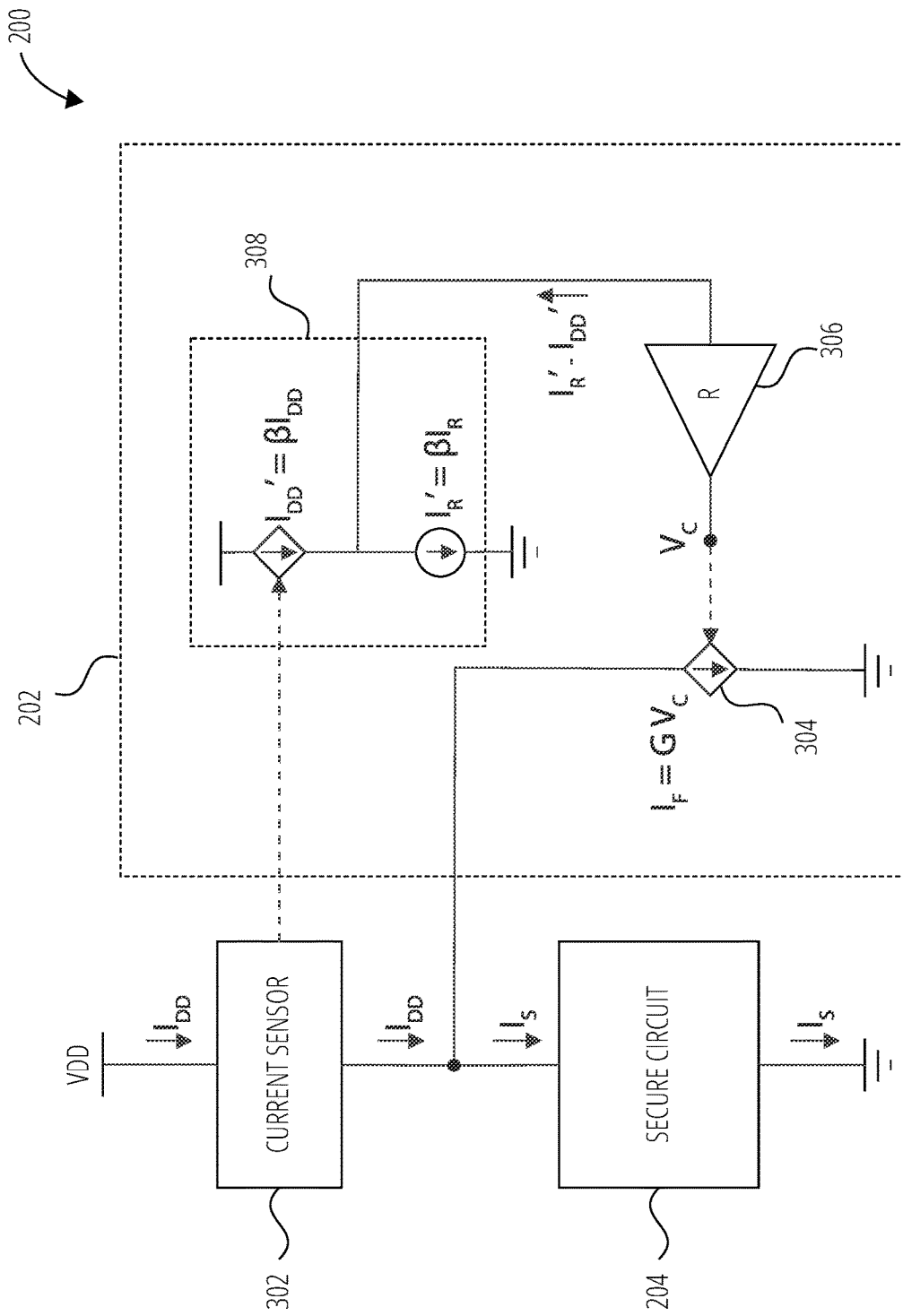
FIG. 3 depicts additional aspects of the prior art circuit package 200 in accordance with one embodiment.

FIG. 3 depicts additional aspects of the prior art circuit package 200. The current flattening circuit 202 of the circuit package 200 inputs a signal from a current sensor 302 and utilizes a differential amplifier 306 and a current divider 308 to control a shunt current from a controlled current source 304. "Controlled current source" refers to a circuit that has an output current controlled by an input signal.

Figure 4:
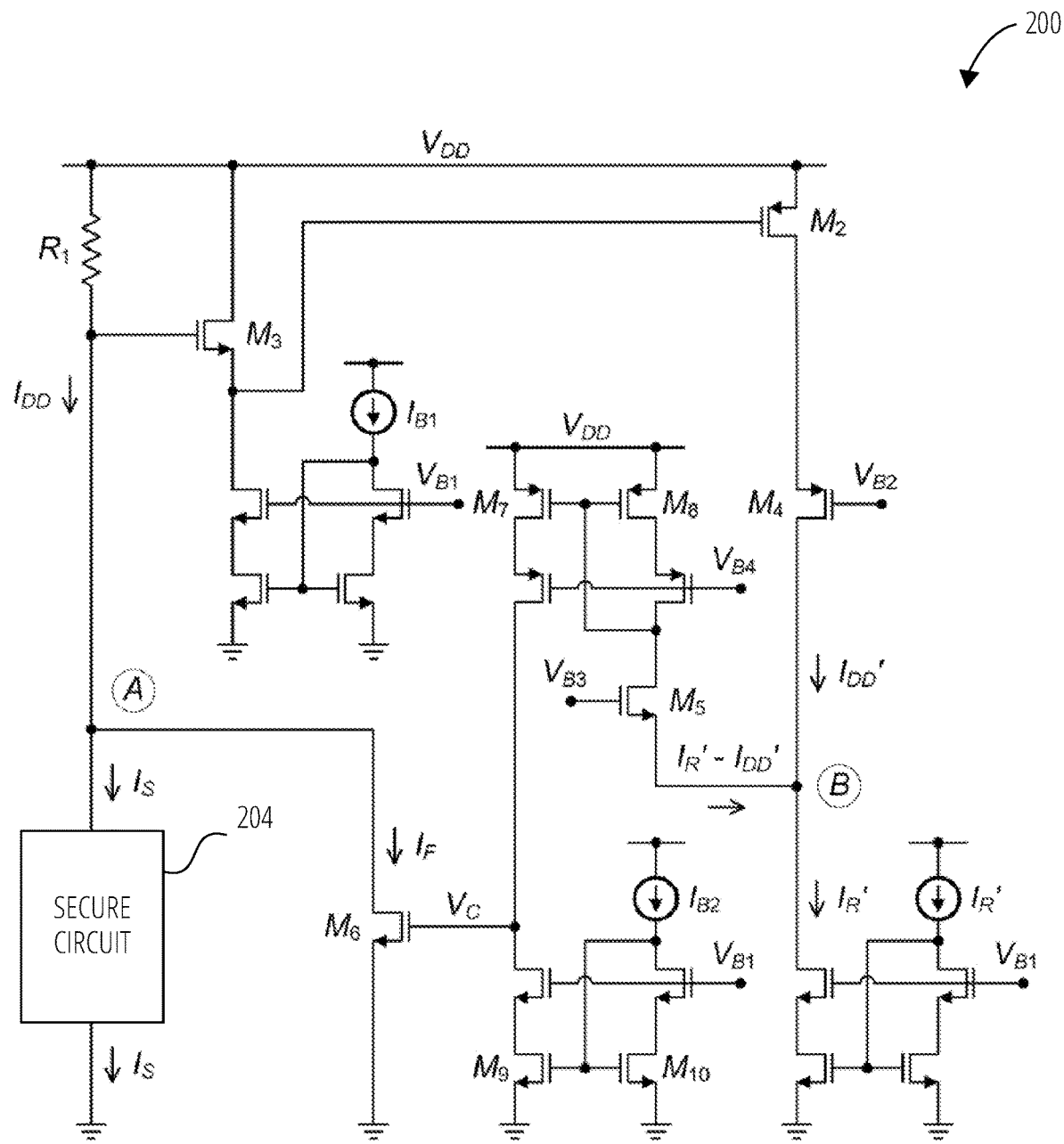
FIG. 4 depicts additional aspects of the prior art circuit package 200.

FIG. 4 depicts detailed features of the prior art circuit package 200. The details of the implementation of the current flattening circuit 202 and their operation may be readily be understood by those of ordinary skill in the art.

Figure 5:
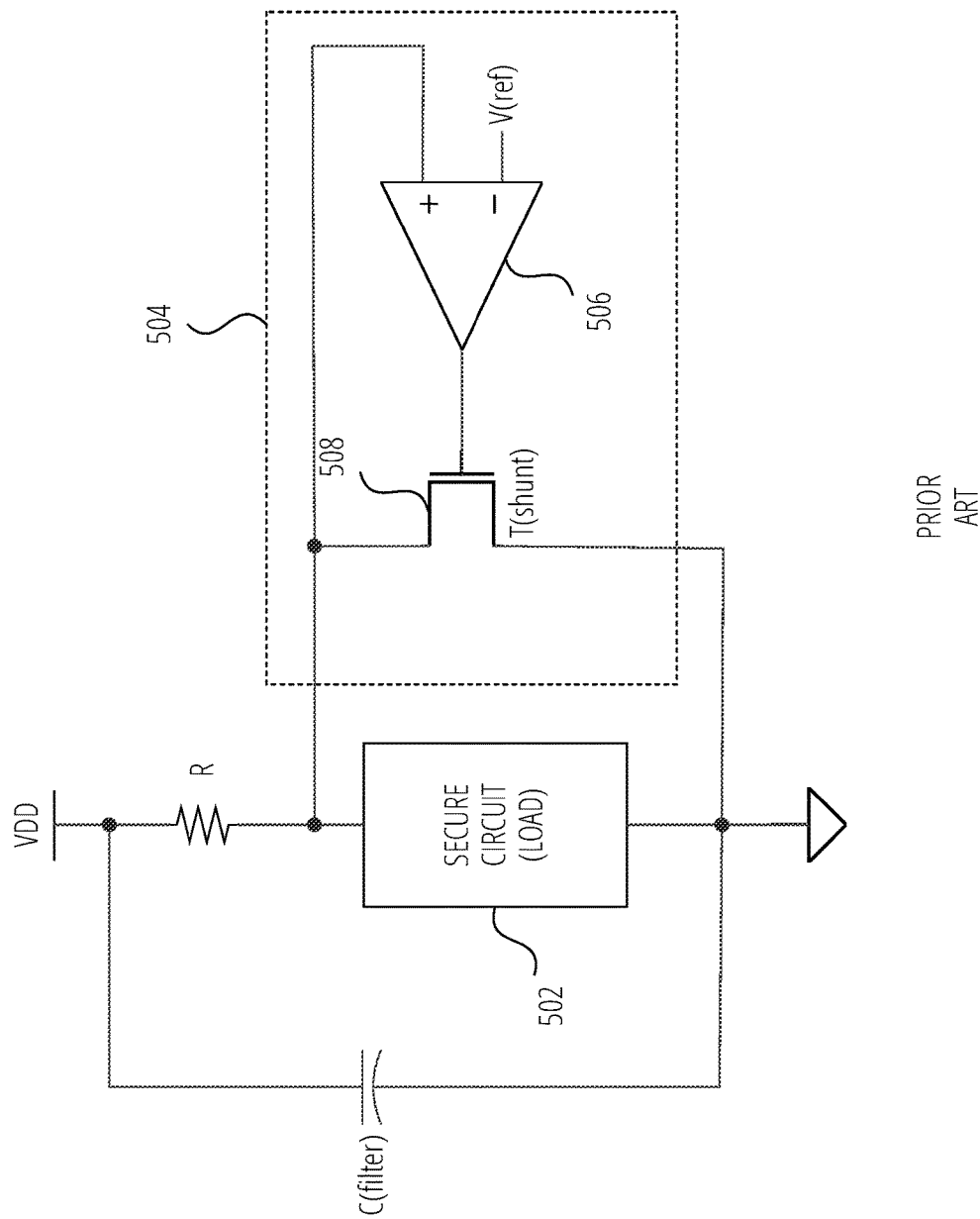
FIG. 5 depicts an alternative prior art side-channel attack protection circuit 500.

FIG. 5 depicts an alternative prior art side-channel attack protection circuit 500. The side-channel attack protection circuit 500 comprises a current flattening circuit 504 utilizing a differential amplifier 506 that drives the gate of a shunt transistor 508 in order to protect a secure circuit (load) 502 from side-channel attacks. A resistor $R_{sense}$ is utilized to distinguish the supply current from the load current.

Figure 6:
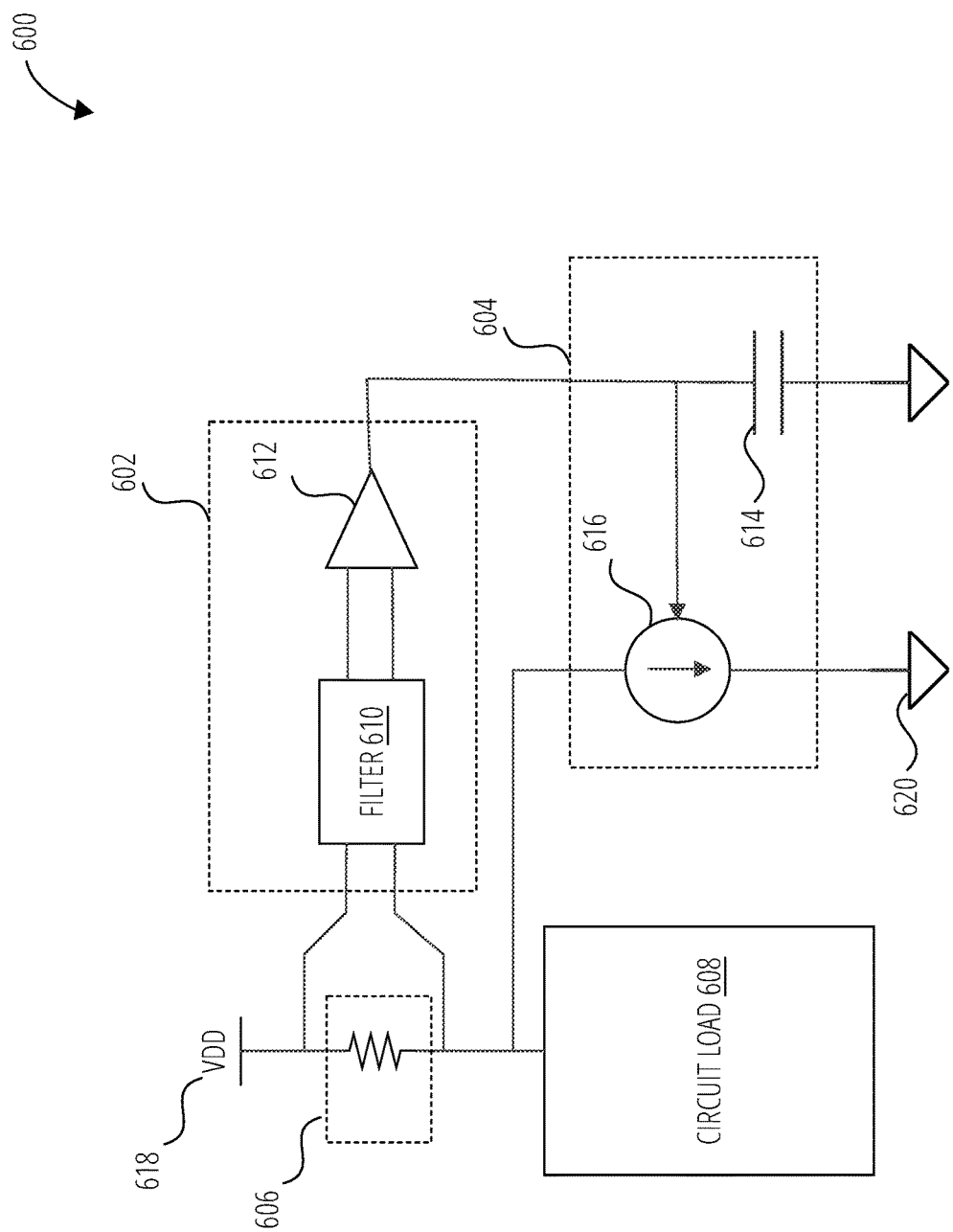
FIG. 6 depicts a feedback current regulator 600 in accordance with one embodiment.

FIG. 6 depicts current flattening circuit implemented as a feedback current regulator 600, in one embodiment. At a high level, the feedback current regulator 600 comprises a sample and gain circuit 602, a shunt current control circuit 604. The feedback current regulator 600 utilizes a load current sensor 606 disposed between a circuit load 608 and a power supply 618.

In the depicted embodiment the load current sensor 606 is coupled to a differential tap to sense the difference between the power supply 618 current and the current that reaches the circuit load 608. The differential signal is input to the sample and gain circuit 602 that in turn proportionally controls the shunt current control circuit 604. The shunt current control circuit 604 provides a varying shunt current from the power input of the circuit load 608 to circuit ground 620. The shunt current is a complimentary current to AC variation in the load current. "Complimentary current" refers to a current mirroring amplitude variations of another current.

The sample and gain circuit 602 comprises a filter 610 and a differential amplifier 612. The filter 610 may be configured as a high pass filter that blocks low-frequency variations in the load current but passes AC components generated by varying power demands of the circuit load 608 during secure computations. The differential outputs of the filter 610 drive the differential amplifier 612. The differential amplifier 612 provides a high-impedance control signal to the controlled current source 616 while imparting a gain. Generally, the differential amplifier may provide a gain that increases or decreases the sensed fluctuation amplitudes as needed for effective response of the shunt current control circuit 604 as called for in the specific implementation.

The shunt current control circuit 604 may include a shunt capacitor 614 and a controlled current source 616. The shunt capacitor 614 may enable portions of the control signal such as noise components to pass to circuit ground 620 while stabilizing other components of the control signal long enough for them to take effect on the controlled current source 616.

The load current sensor 606 used to detect the supply current may be a sense resistor. This sense resistor may range from 100 milliohms to 10 ohms in various embodiments, depending on the characteristics of the current being sensed. A sensed voltage across the resistor may be used to deduce fluctuations in the load current in accordance with Ohm's Law, shown in Equation 1.

$$V=IR \qquad \text{Equation 1}$$

where V is voltage, I is current, and R is resistance.

Figure 7:
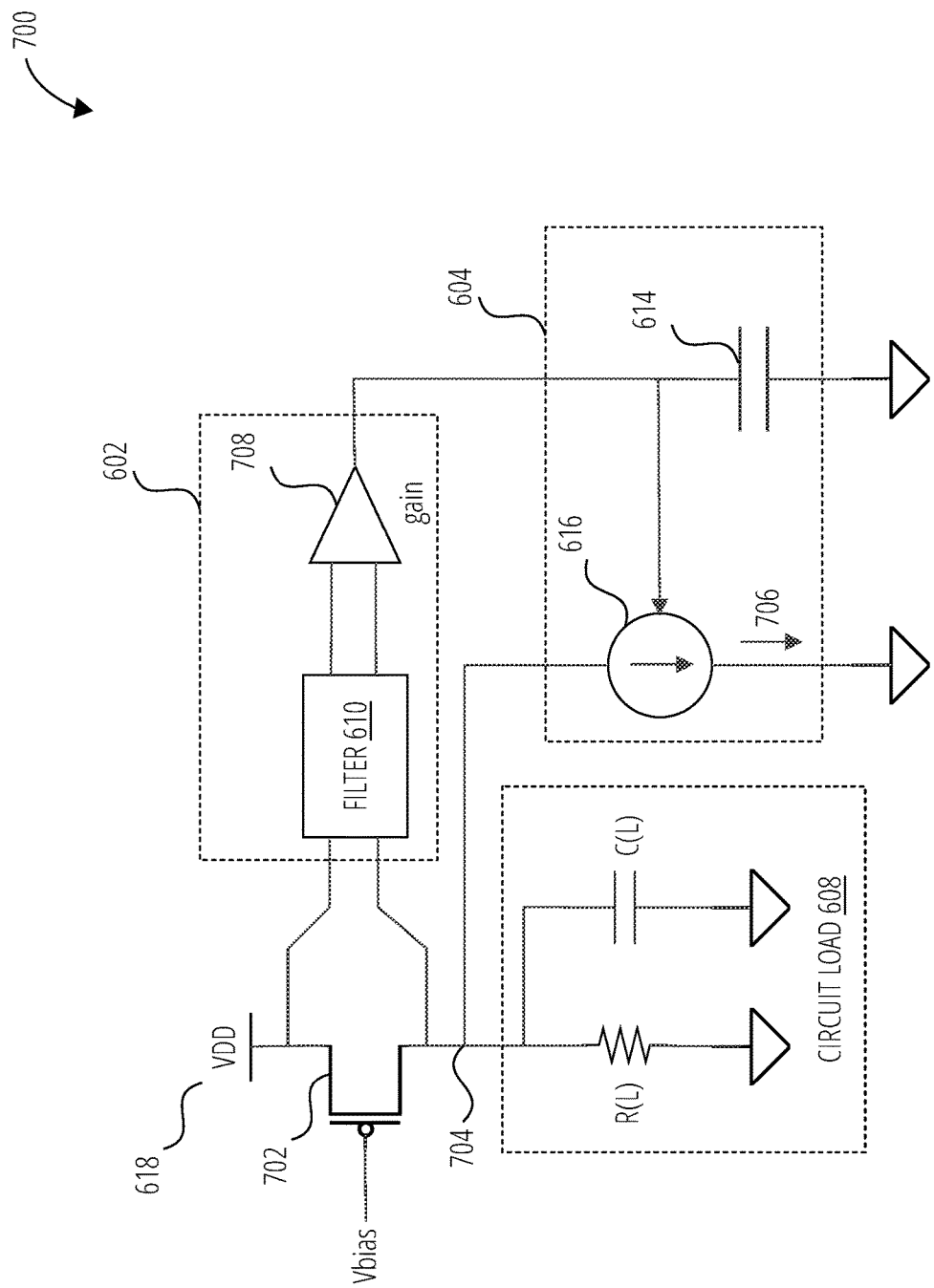
FIG. 7 depicts a current regulator with pass-gate 700 in accordance with one embodiment.

FIG. 7 depicts a current flattening circuit implemented as a feedback current regulator with pass-gate 700. In this embodiment the load current sensor 606 is implemented using one or more transistor, such as one or more PMOS transistor 702 arranged in series with the circuit load 608. In the current regulator with pass-gate 700 the PMOS transistor replaces the sense resistor depicted in FIG. 6. In FIG. 7 the circuit load 608 is depicted as an RC load.

Unlike conventional solutions, the current regulator with pass-gate 700 utilizes a regulated control on the controlled current source 616 to set the voltage at the node 704, rather than an open loop control. Conventional solutions may utilize a controlled current source between the power supply 618 and the node 704, controlled via a feedback loop. Unlike those solutions, the current regulator with pass-gate 700 maintains a fixed voltage/current that does not vary at the gate of a PMOS transistor 702 between the power supply 618 and the node 704.

The current flattening circuit is configured such that a differential tap across the one or more PMOS transistor 702 controls a shunt current 706. The gate bias voltage of the PMOS transistor 702 may be held constant. The PMOS transistor 702 may enable the use of lower gain in the sample and gain circuit 602 than would be needed using other sensor components, such as resistors. This may facilitate regulation of the load voltage at node 704 in concert with the current regulation. $V_{bias}$ may be set to provide a current margin between the supply current and load current, such that an adequate shunt current 706 may be generated to counteract fluctuations in the load current. This is described in additional detail with regard to FIG. 12.

The filter 610 of the sample and gain circuit 602 may be a differential high pass filter coupled across the PMOS transistor 702. In some embodiments, multiple PMOS transistors may be stacked in series between the power supply 618 and the circuit load 608 to provide the load current sensor 606. In this case, differential sampling by the high pass filter 610 may be performed across any one or more of the stacked transistors. In some embodiments, the differential high pass filter 610 may comprise a mirrored pair of cells, each cell comprising a PMOS transistor stacked with an NMOS transistor. "Mirrored pair of cells" refers to two circuits with similar elements in a mirrored configuration. In some embodiments, the differential high pass filter 610 may be designed to impart a gain to the sensed signals before these signals are sent to the differential amplifier 708. Other pass gate configurations may be used in in place of the PMOS transistor 702.

A differential amplifier 708 may be interposed between the filter 610 and the controlled current source 616 of the shunt current control circuit 604. In some embodiments, as shown, the differential amplifier 708 may amplify or impart gain to the sensed signals, increasing an amplitude of the control signal output to the shunt current control circuit 604. In some embodiments the differential amplifier 708 may impart some phase shift to the sensed signals.

Figure 8:
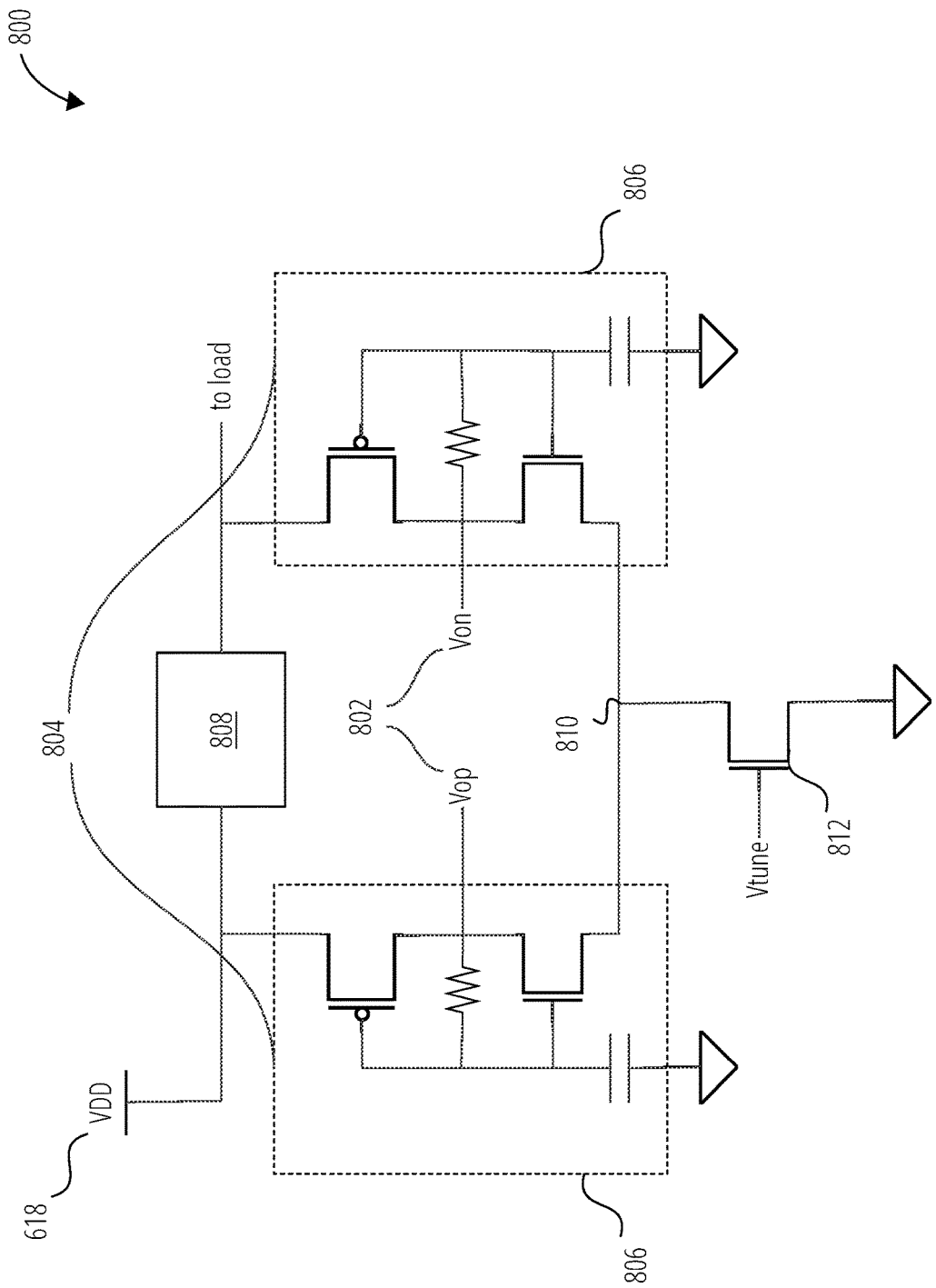
FIG. 8 depicts a differential high pass filter with gain 800 in accordance with one embodiment.

FIG. 8 depicts a differential high pass filter with gain 800 in one embodiment. At a high level, the differential high pass filter with gain 800 comprises differential high pass filter outputs 802 generated by a mirrored pair of cells 804, these cells each being a PMOS transistor-NMOS transistor stack 806. Each of the transistor stacks 806 is coupled to one side of a load current sensor 808. The sides of each of the transistor stacks 806 not coupled to the load current sensor 808 are coupled together at a node 810 that is then coupled to circuit ground through a tuning transistor 812.

The load current sensor 808 may be a sense resistor as shown in FIG. 6, one or more PMOS transistors 702, as shown in FIG. 7, other pass-gate configurations, or an alternate configuration providing a signal indicating changes in voltage and/or current across the load current sensor 808. The differential tap on the load current sensor 808 provide inputs to a differential high pass filter.

In the illustrated embodiment, mirrored transistor stacks 806 configured with a tuning transistor 812 are configured as a differential high pass filter. Each PMOS transistor-NMOS transistor stack 806 comprises a PMOS transistor, an NMOS transistor, a resistor, and a capacitor, as illustrated. The gates of the transistors are coupled together, along with one side of the resistor, and to one side of the capacitor. The other side of the capacitor is connected to ground. The source side of the PMOS transistor is coupled to one side of the load current sensor 606. The drain side of the PMOS transistor and the drain side of the NMOS transistor are coupled together, along with the other end of the resistor, and this node forms the differential high pass filter output 802 for that PMOS transistor-NMOS transistor stack 806. The resistor/capacitor circuit portion of the PMOS transistor-NMOS transistor stack 806 may dynamically drive the gates of the PMOS and NMOS transistors such that particular frequency components of the differential tapped signals from the load current sensor 808 are passed to the differential high pass filter output 802, filtering out other components, while also introducing some gain (which may be unity) between the differential tapped signals and the signals at the differential high pass filter output 802.

The source sides of the NMOS transistors of the mirrored pair of cells may be coupled together, as well as to the drain side of a tuning transistor 812. This tuning transistor 812 may enable the current source, high pass filter, and gain elements to be integrated into a single circuit structure. To save power the current regulation mode can be turned ON on condition that the load is active and turned OFF during other times through the action of $V_{tune}$ on the tuning transistor 812.

When the current flattening circuit is applied, the remaining load current that is leaked to the power supply pin is given by the following equation.

$$I_{supply} = I_{load} + I_{reg} = \frac{I_{load}}{(1 + R_{sense} \times A \times g_m)} \quad \text{Equation 2}$$

where A is the gain in the gain element and $g_m$ is the transconductance of the controlled current source providing the shunt current. If an NMOS transistor is used for this component, then $g_m$ is the transconductance of the NMOS transistor.

$V_{tune}$ may also be set to provide a current margin between the supply current and load current. This may ensure that an adequate amount of complimentary current is generated to counteract fluctuations in the load current. This is described in additional detail with regard to FIG. 12.

Figure 9:
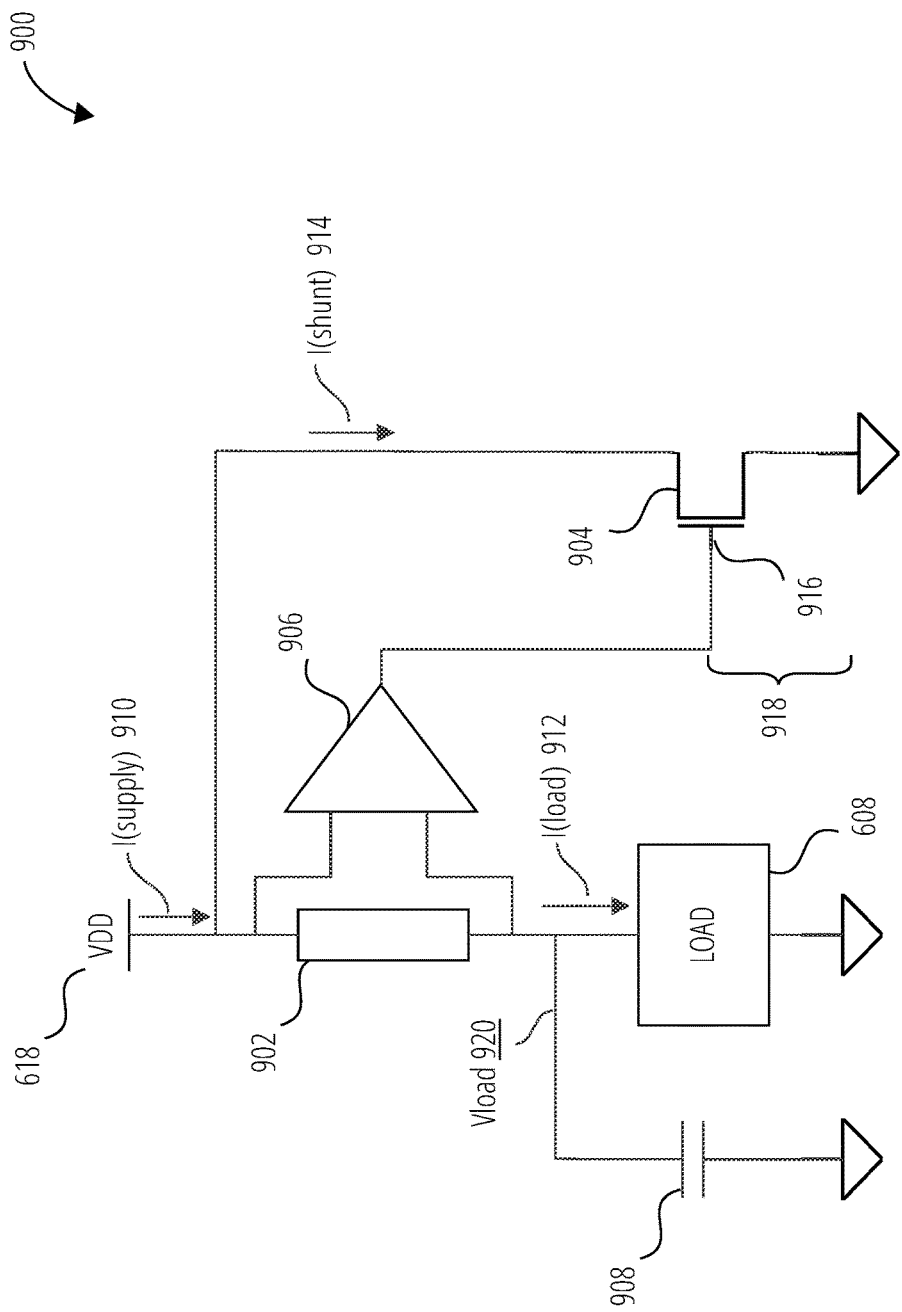
FIG. 9 depicts a feed-forward current regulator 900 in accordance with one embodiment.

FIG. 9 depicts a feed-forward current regulator 900 in one embodiment. The feed-forward current regulator 900 comprises a load current sensor 902, a shunt transistor 904, a differential amplifier 906, and a filter capacitor 908, configured to attenuate AC variations to supply current 910 caused by variations in the load current 912 drawn by a circuit load 608.

The load current sensor 902 receives supply current 910 from a power supply 618 and supplies current to the circuit load 608. In various embodiments the load current sensor 902 may be a resistor, one or more PMOS transistor in series, or a pass-gate transistor configuration.

The differential amplifier 906 may be coupled as a differential tap across the load current sensor 902 in order to amplify and/or isolate sensed differences between the supply current 910 and the load current 912 and control a gate of the shunt transistor 904 to attenuate the effect of variations of the load current 912 on the supply current 910. The shunt transistor 904 may have its source terminal connected at a terminal that receives the supply current 910 and its drain terminal grounded. In some embodiments, the shunt transistor 904 may be an NMOS transistor as shown.

The shunt transistor gate voltage 918 applied at the gate 916 of the shunt transistor 904 is generated by the differential amplifier 906 such that the shunt current 914 is a complimentary current to the dynamic difference between the supply current 910 and the supply current 910. In this manner, the supply current 910 may be held steady, as shunt current 914 may increase as load current 912 decreases and vice-versa.

The filter capacitor 908 helps smooth out variations in the load voltage 920 as the circuit load 608 dynamically draws variable current to carry out calculations.

If $R_{sense} * A * g_m = -1$, then the alternating current component of the load current is perfectly cancelled by the regulator current. The amplifier gain A or the transconductance $g_m$ of the shunt transistor 904 may be calibrated to achieve $R_{sense} * A * g_m$ equal to or close to $-1$.

Figure 10:
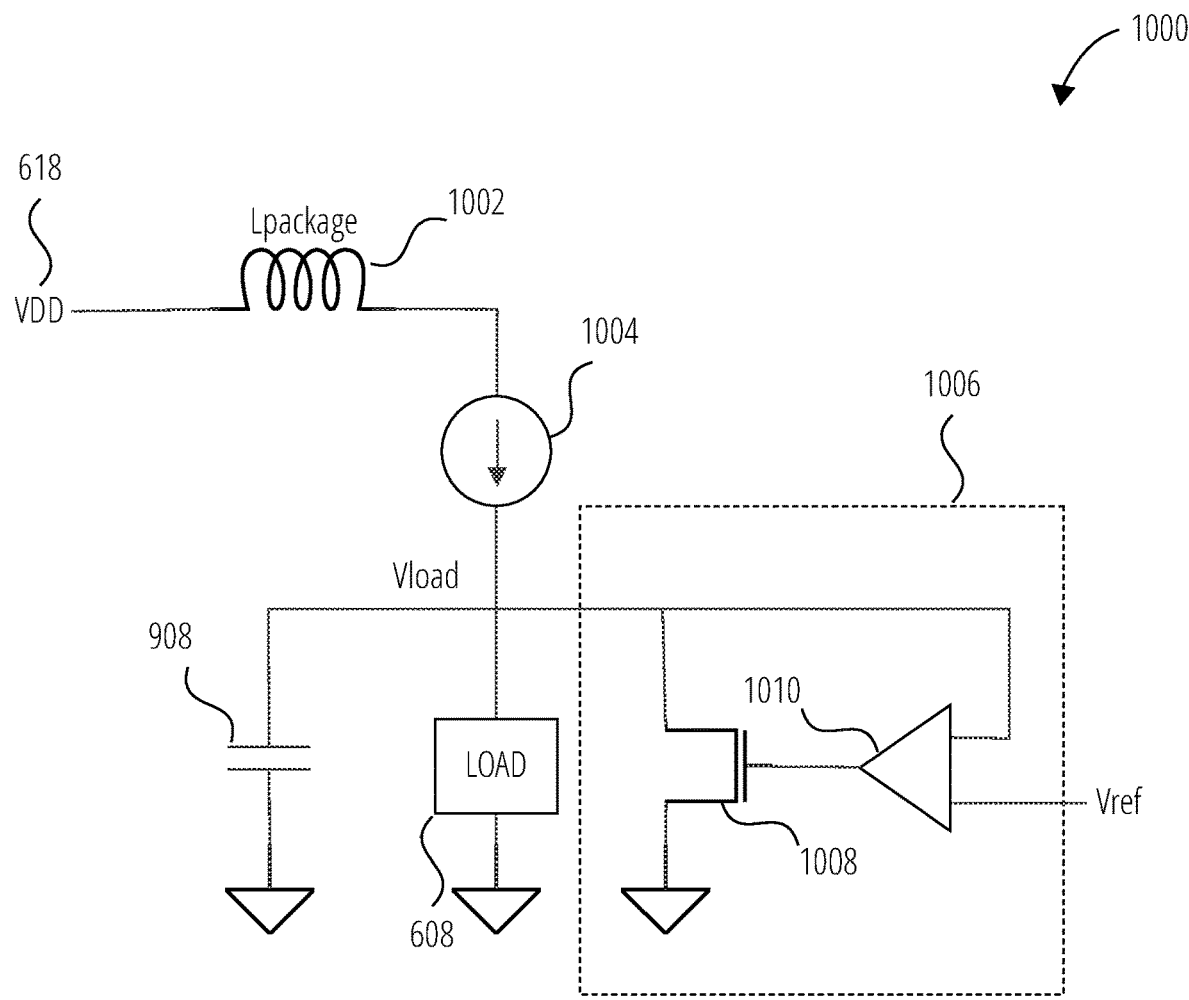
FIG. 10 depicts a current flattening circuit 1000 in accordance with one embodiment.

FIG. 10 depicts current flattening circuit 1000 in another embodiment. At a high level, the current flattening circuit 1000 comprises a constant current source 1004, a high bandwidth current regulator 1006, and a filter capacitor 908 configured to protect a circuit load 608 from side-channel attacks. A parasitic inductance due to package architecture is modeled as package inductance 1002 between the power supply 618 and the constant current source 1004. "Constant current source" refers to a circuit configured to pull its output current toward a configured constant level.

The high bandwidth current regulator 1006 comprises a differential amplifier 1010 that compares the load voltage $V_{load}$ with a reference voltage $V_{ref}$ and generates a proportional control output to the gate of an NMOS transistor 1008. shunts a complimentary current of load current AC components and thus prevents these components from propagating back to the power supply 618. The constant current source 1004 may be implemented using PMOS or NMOS transistors, which have finite output impedance $r_0$. The high bandwidth current regulator 1006 mitigates the leakage of load voltage/load current information through $r_0$ by sinking load current transients to ground. The filter capacitor 908 helps maintain $V_{load}$ stable in the presence of the dynamic shunt current complimentary current that is generated by the high bandwidth current regulator 1006.

Figure 11:
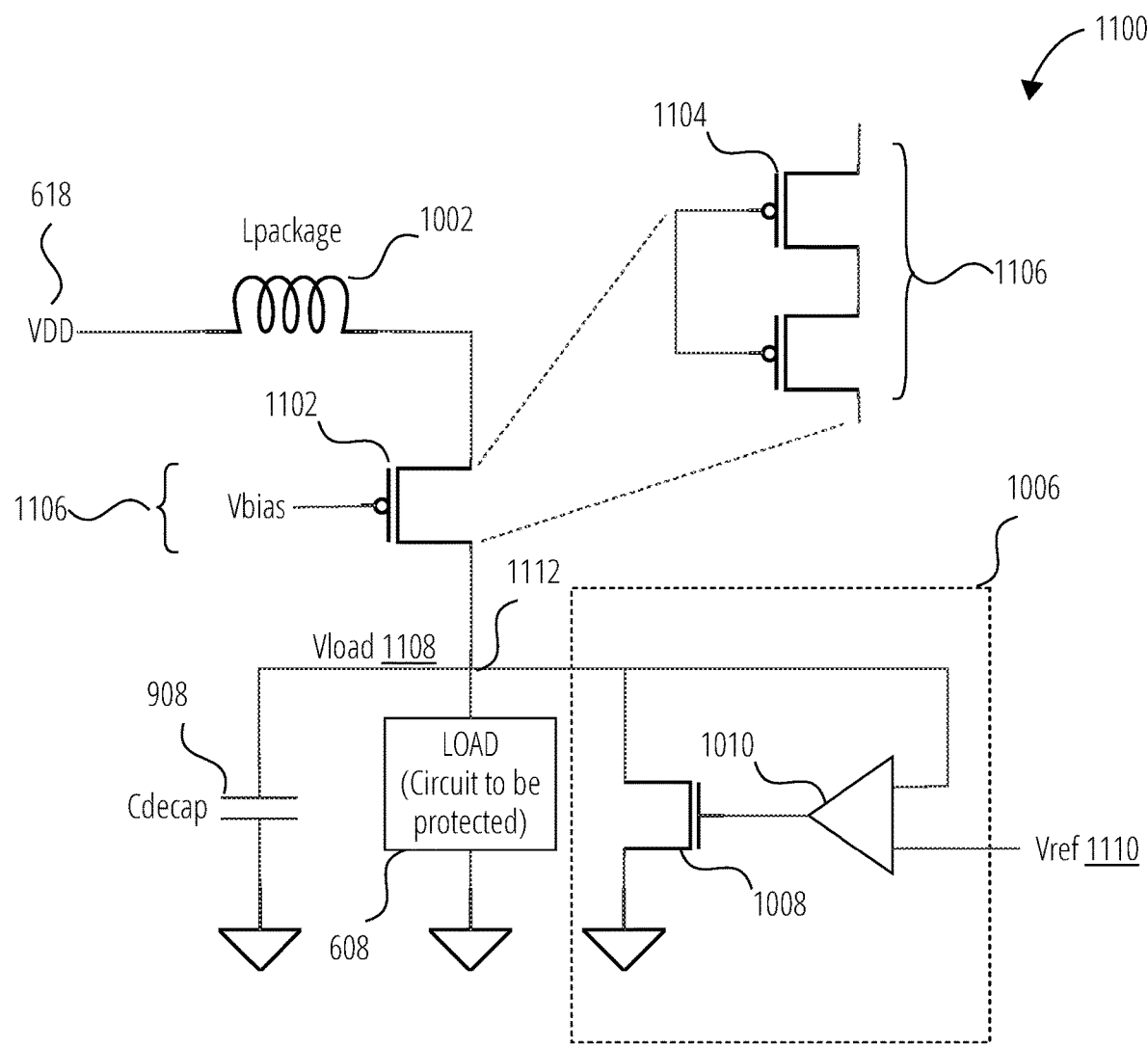
FIG. 11 depicts a current flattening circuit with constant current source 1100 in accordance with one embodiment.

FIG. 11 depicts a current flattening circuit with constant current source 1100 in one embodiment in which the constant current source 1004 comprises a PMOS transistor 1102 or PMOS transistor stack 1104. As shown, at least one PMOS transistor 1102 may be interposed between the power supply 618 and the circuit load 608. An NMOS transistor 1008 acting as a shunt transistor and a differential amplifier 1010 may each couple to a node 1112 between the at least one PMOS transistor 1102 and the circuit load 608. The shunt transistor gate voltage may be configured to be controlled by the differential amplifier 1010. The differential amplifier 1010 may be coupled to compare a reference voltage 1110 and a load voltage 1108.

The output impedance $r_0$ of the constant current source 1004 may be improved by stacking one or more pass-gate transistors 1106, such as a PMOS transistor stack 1104. The bias voltage $V_{bias}$ for the constant current source 1004 may be generated by a bandgap reference generator.

Figure 12:
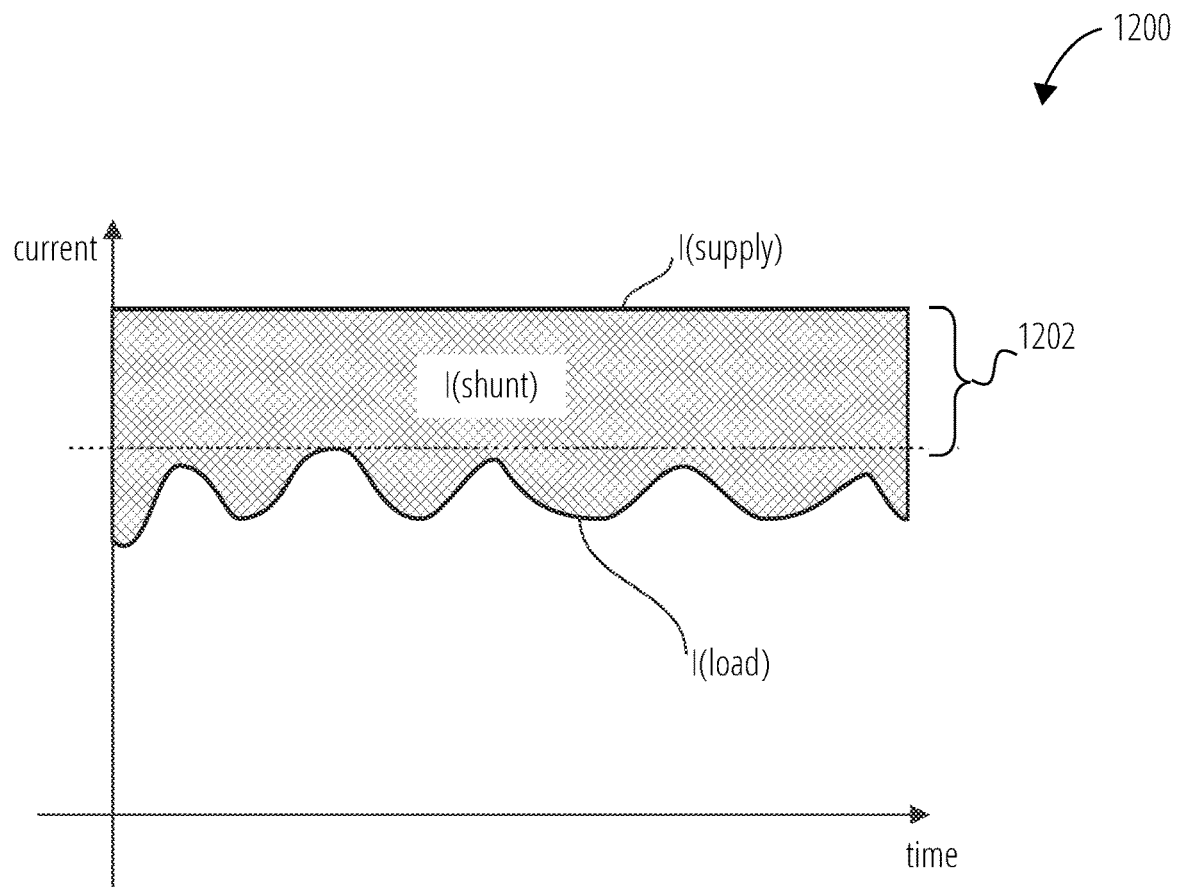
FIG. 12 depicts a current characteristic graph 1200 in accordance with one embodiment.

FIG. 12 depicts an exemplary current characteristic graph 1200. During operation of an electrical load, the load current may fluctuate due to variations in computational complexity of a secure algorithm. This is depicted by the variation of $I_{load}$ over time. Through implementation of the apparatuses disclosed herein, a shunt current $I_{shunt}$ is generated to create a current margin 1202 that prevents or reduces influence of the load current variations on the supply current $I_{supply}$.

This current margin 1202 may be configured such that the power supply accommodates the combined draw of the shunt current and the load current. For example, the supply current for a particular implementation may provide 120 mA while the load may be expected to draw a peak load current of 80 mA. Thus, a current margin 1202 of 40 mA may be provided to absorb fluctuations in the load current.

An inadequate current margin 1202 may result in a draw upon the power supply that exceeds what can be compensated for by the shunt current. For cases when the shunt current cannot compensate for changes in the load current, information may be leaked at a power pin, making the integrated circuit vulnerable to side-channel attack.

In some embodiments, a static current margin 1202 may be implemented to provide conservative protection where power consumption may not be a concern. In other embodiments, a circuit may be characterized to determine a peak load current, and a tight current margin 1202 may be configured in order to save power. Some embodiments may be capable of adjusting the current margin 1202 dynamically to account for operating conditions of the load during operation.

The current margin 1202 may be configured by setting $V_{bias}$ on the one or more pass-gate transistors 1106, and/or $V_{tune}$ on the differential high pass filter with gain 800.

Figure 13:
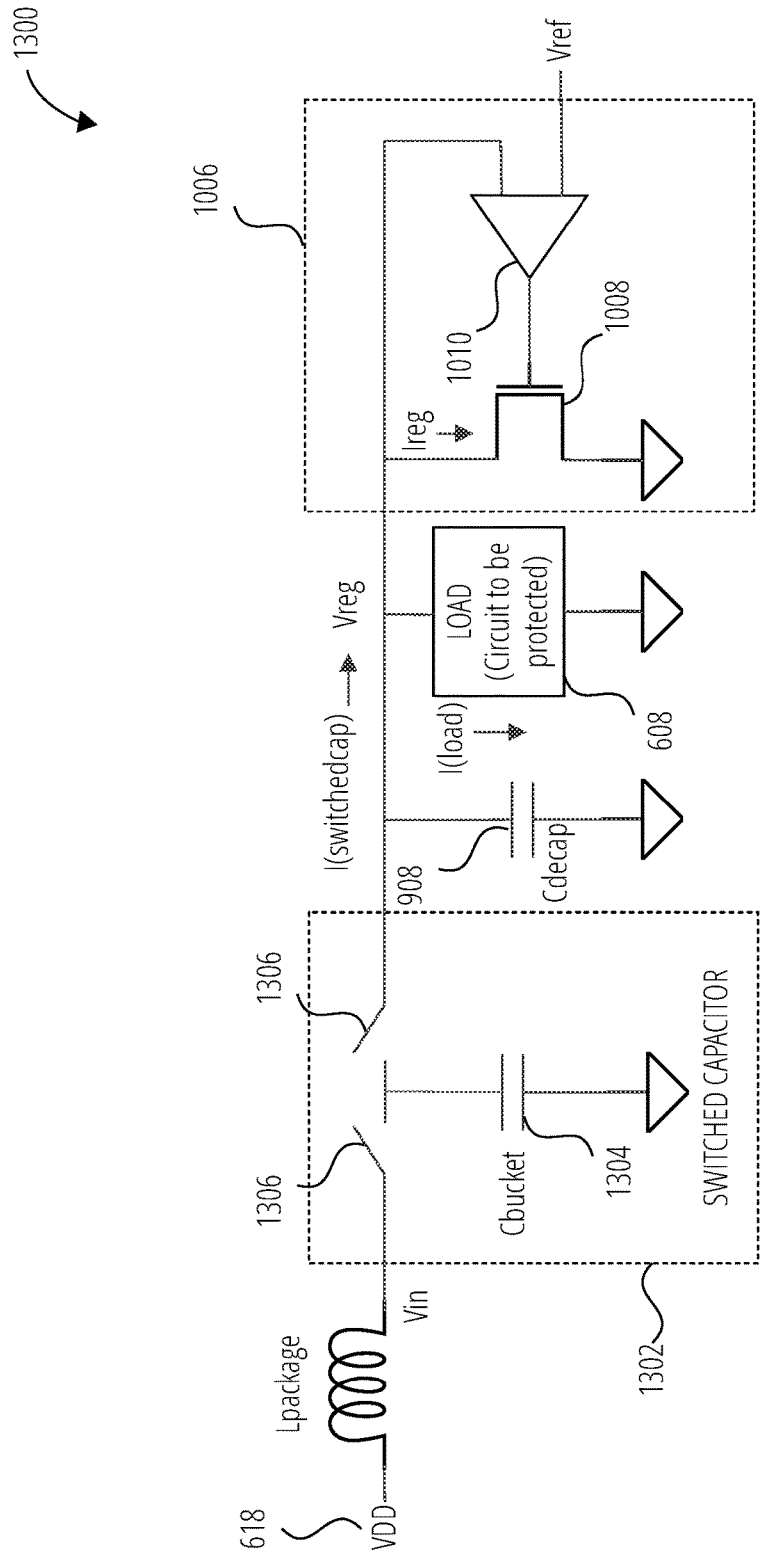
FIG. 13 depicts a current flattening circuit with switched capacitor constant current source 1300 in accordance with one embodiment.
Figure 14:
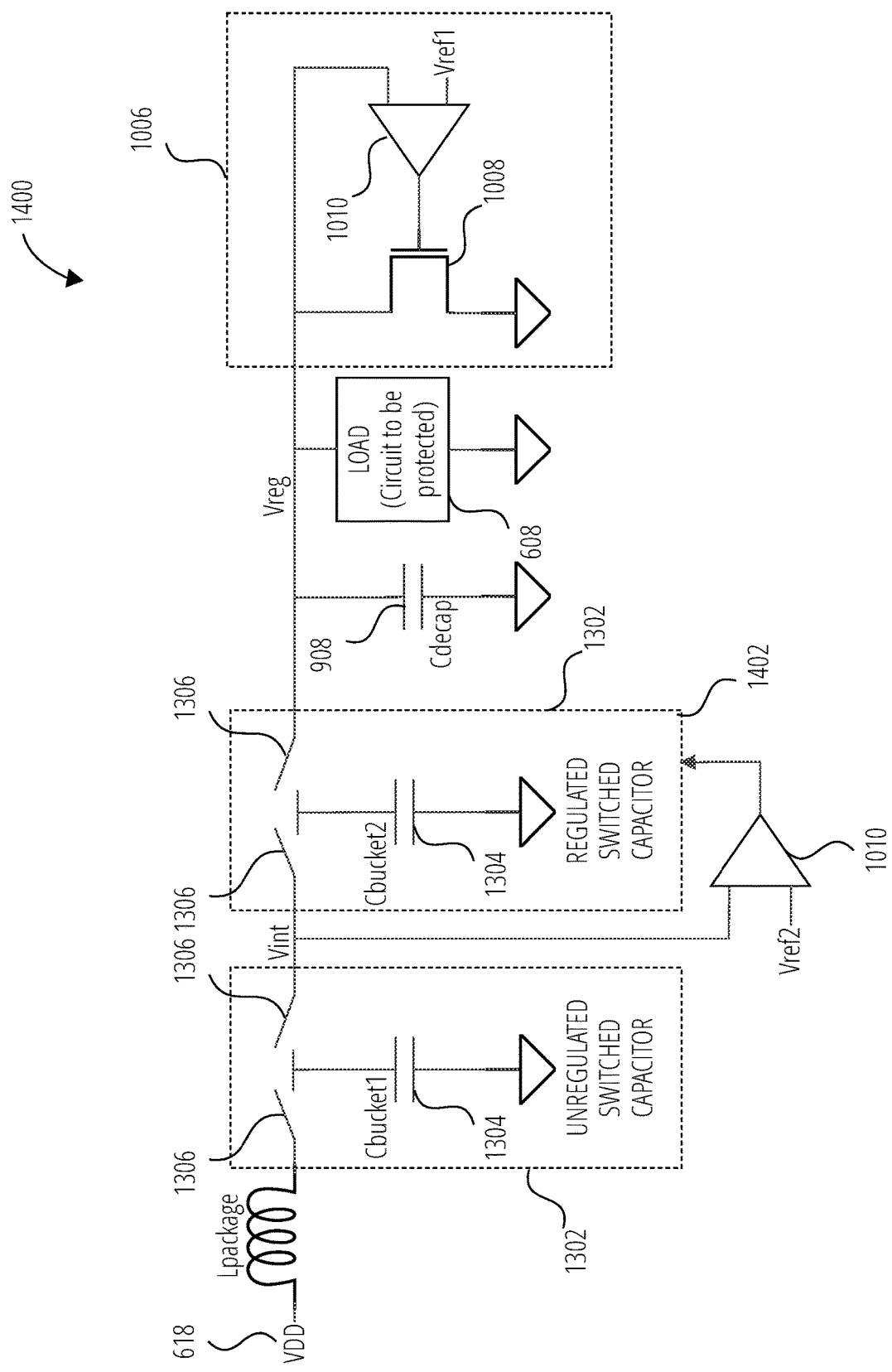
FIG. 14 depicts a current flattening circuit with multiple switched capacitors 1400 in accordance with one embodiment.

FIG. 13 depicts a current flattening circuit with switched capacitor constant current source 1300 in one embodiment in which the constant current source comprises a switched capacitor 1302 implemented with solid state switches 1306 and a bucket capacitor 1304. FIG. 14 depicts a current flattening circuit with multiple switched capacitors 1400.

The switched capacitor circuit isolates the load from the supply. After each energy transfer from the supply to the load the transfer/bucket capacitor charge is equalized such that when the transfer capacitor is re-connected to the supply a consistent amount of charge is drawn from the supply irrespective of the operation being performed at the load.

A high bandwidth current regulator 1006 may be combined with the unregulated switched capacitor 1302 configured to deliver a current to the Vreg node exceeds the load current by a configured current margin 1202.

$$I_{switchedcap} = I_{load,DC} + I_{load,AC\,peak} + I_{margin}$$

This can be enabled by selecting the switching frequency $f_{switching}$ and the bucket capacitor 1304 size as given by the following equation $$I_{switchedcap} = C_{bucket} * \Delta V * f_{switching}$$

Where $\Delta V = V_{in} - V_{reg}$ and $f_{switching}$ is the switched capacitor 1302 switching frequency.

The high bandwidth current regulator 1006 maintains $V_{reg} = V_{ref}$ by shunting the extra current supplied by the switched capacitor 1302.

$$I_{reg} = I_{switchedcap} - I_{load}$$

The voltage on the switched capacitor 1302 varies between $V_{in}$ and $V_{reg}$ irrespective of load activity. Each switching cycle of the switched capacitor 1302 draws a constant amount of current from the power supply 618 thereby masking the load activity.

FIG. 14 depicts a current flattening circuit with multiple switched capacitors 1400, utilizing a first switched capacitor 1302 that is unregulated, and a second switched capacitor 1402 that is unregulated. The second switched capacitor 1402 regulates the node $V_{int}$ constant at voltage $V_{ref2}$ with reduced load variation than occurs at the $V_{reg}$ node. This further reduces any load activity information that may potentially leak to the power supply 618.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A current flattening circuit comprising:
   at least one PMOS transistor interposed between a power supply and a load;
   a shunt transistor and a differential amplifier each coupled to a node between the at least one PMOS transistor and the load; and
   a gate voltage of the shunt transistor configured to be controlled by the differential amplifier.

2. The current flattening circuit of claim 1, wherein the shunt transistor is an NMOS transistor.

3. The current flattening circuit of claim 2, wherein the differential amplifier is coupled to input a reference voltage and a load voltage.

4. A current flattening circuit comprising:
   a shunt transistor coupled to receive current directly from a power supply and configured with a fixed gate bias voltage;
   a load current sensor coupled to directly receive the current from the power supply and to supply current directly to a load; and
   a differential amplifier coupled across the load current sensor to control a gate of the shunt transistor.

5. The current flattening circuit of claim 4, wherein the load current sensor is a resistor.

6. The current flattening circuit of claim 4, wherein the load current sensor is at least one PMOS transistor.

7. The current flattening circuit of claim 4, wherein the load current sensor is a plurality of PMOS transistors.

8. The current flattening circuit of claim 4, wherein the shunt transistor is an NMOS transistor.

9. A current flattening circuit comprising:
   a load current sensor interposed between a power supply and a load;
   a differential high pass filter coupled across the load current sensor, the differential high pass filter having a gain;
   a differential amplifier coupled to outputs of the differential high pass filter; and
   the differential amplifier coupled to drive a gate of a shunt transistor of the load.

10. The current flattening circuit of claim 9 wherein the load current sensor is a resistor.

11. The current flattening circuit of claim 9 wherein the load current sensor is a transistor.

12. The current flattening circuit of claim 11 wherein the transistor is a PMOS transistor configured with a fixed gate bias voltage.

13. The current flattening circuit of claim 9 further comprising a capacitor to the gate of the shunt transistor.

* * * * *